US009049013B2

(12) United States Patent
Paczkowski et al.

(10) Patent No.: US 9,049,013 B2
(45) Date of Patent: Jun. 2, 2015

(54) TRUSTED SECURITY ZONE CONTAINERS FOR THE PROTECTION AND CONFIDENTIALITY OF TRUSTED SERVICE MANAGER DATA

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 175 days.

(21) Appl. No.: 13/831,463

(22) Filed: Mar. 14, 2013

(65) Prior Publication Data

US 2014/0281544 A1    Sep. 18, 2014

(51) Int. Cl.
  *G06F 21/00* (2013.01)
  *H04L 9/08* (2006.01)
  *G06Q 10/00* (2012.01)
(52) U.S. Cl.
  CPC .............. *H04L 9/0866* (2013.01); *G06Q 10/00* (2013.01); *H04L 2209/80* (2013.01)
(58) Field of Classification Search
  None
  See application file for complete search history.

(56) References Cited

U.S. PATENT DOCUMENTS

| 5,303,378 | A  | 4/1994  | Cohen |
| 5,796,952 | A  | 8/1998  | Davis et al. |
| 6,131,024 | A  | 10/2000 | Boltz |
| 6,219,712 | B1 | 4/2001  | Mann et al. |
| 6,477,180 | B1 | 11/2002 | Aggarwal et al. |
| 6,668,322 | B1 | 12/2003 | Wood et al. |
| 6,691,230 | B1 | 2/2004  | Bardon |
| 6,754,784 | B1 | 6/2004  | North et al. |
| 6,823,454 | B1 | 11/2004 | Hind et al. |

(Continued)

FOREIGN PATENT DOCUMENTS

| WO | WO2011025433 A1 | 3/2011 |
| WO | 2013170228 A2  | 11/2013 |

(Continued)

OTHER PUBLICATIONS

Advisory Action dated Jun. 23, 2014, U.S. Appl. No. 13/571,348, filed Aug. 10, 2012.

(Continued)

*Primary Examiner* — Saleh Najjar
*Assistant Examiner* — William G O'Hara

(57) ABSTRACT

Embodiments relate generally to systems and methods for providing access to a trusted security zone container within a trusted security zone of a mobile device. An application may receive trusted service manager validation data from a trusted service manager. The application may also receive a trusted security zone master key, wherein the trusted security zone master key provides access to a plurality of trusted security zone containers within the trusted security zone. The application may hash the trusted service manager validation data with the trusted security zone master key. The application may generate the trusted security zone sub key based on hashing to access one or more containers. One or more signal may be transmitted to provision the set of one or more trusted security zone containers with the trusted security zone sub key. The application may provide the sub key to the trusted service manager to access a container.

20 Claims, 9 Drawing Sheets

(56) References Cited

U.S. PATENT DOCUMENTS

| | | |
|---|---|---|
| 6,824,064 B2 | 11/2004 | Guthery et al. |
| 6,895,234 B1 | 5/2005 | Laursen et al. |
| 7,387,240 B2 | 6/2008 | Ziegler |
| 7,552,467 B2 | 6/2009 | Lindsay |
| 7,571,364 B2 | 8/2009 | Whetsel |
| 7,650,645 B1 | 1/2010 | Langendorf et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,190,919 B2 * | 5/2012 | Natarajan et al. ............ 713/193 |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,954,588 B1 | 2/2015 | Bertz et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |

(56) References Cited

U.S. PATENT DOCUMENTS

| | | |
|---|---|---|
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1* | 7/2013 | Spector et al. ............... 713/155 |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347103 A1 | 12/2013 | Veteikis et al. |
| 2014/0033316 A1 | 1/2014 | Paczkowski et al. |
| 2014/0047548 A1 | 2/2014 | Bye et al. |
| 2014/0074508 A1 | 3/2014 | Ying et al. |
| 2014/0155025 A1 | 6/2014 | Parker et al. |
| 2014/0188738 A1 | 7/2014 | Huxham |
| 2014/0245444 A1 | 8/2014 | Lutas et al. |
| 2014/0254381 A1 | 9/2014 | Racz Sandor et al. |
| 2014/0279558 A1 | 9/2014 | Kadi et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated Jun. 4, 2014, U.S. Appl. No. 13/557,213, filed Jul. 25, 2012.

FAIPP Pre-Interview Communication dated Aug. 4, 2014, U.S. Appl. No. 13/844,357, filed Mar. 15, 2013.

Notice of Allowance dated Jul. 8, 2014, U.S. Appl. No. 13/802,383, filed Mar. 13, 2013.

Restriction Requirement dated Aug. 14, 2014, U.S. Appl. No. 13/594,777, filed Aug. 25, 2012.

FAIPP Pre-Interview Communication dated Jul. 17, 2014, U.S. Appl. No. 13/594,778, filed Aug. 25, 2012.

FAIPP Pre-Interview Communication dated Jul. 17, 2014, U.S. Appl. No. 13/594,779, filed Aug. 25, 2012.

Office Action dated May 5, 2014, U.S. Appl. No. 13/786,450, filed Mar. 5, 2013.

FAIPP Pre-Interview Communication dated Aug. 6, 2014, U.S. Appl. No. 13/831,486, filed Mar. 14, 2013.

Ahmed, Farid, et al., "Correlation-based Watermarking Method for Imagine Authentication Applications", Society of Photo-Optical Instrumentation Engineers, Feb. 17, 2004, pp. 1834-1838.

(56) References Cited

OTHER PUBLICATIONS

Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", U.S. Appl. No. 14/066,661, filed Oct. 29, 2013.
Bertz, Lyle T., et al., "Framework for Real-Time Brokering of Digital Content Delivery," U.S. Appl. No. 13/594,777, filed Aug. 25, 2012.
Bertz, Lyle T., et al., "Reservations in Real-Time Brokering of Digital Content Delivery," U.S. Appl. No. 13/594,778, filed Aug. 25, 2012.
Bertz, Lyle T., et al., "File Retrieval in Real-Time Brokering of Digital Content Delivery," U.S. Appl. No. 13/594,779, filed Aug. 25, 2012.
Paczkowski, Lyle W., et al., "Trusted Security Zone Watermark", U.S. Appl. No. 13/786,450, filed Mar. 5, 2013.
Paczkowski, Lyle W., et al., "Trusted Processing Location Within a Graphics Processing Unit", U.S. Appl. No. 13/939,175, filed Jul. 10, 2013.
McCracken, Billy Gene, Jr., et al. "Mobile Communication Device Profound Identity Brokering Framework", U.S. Appl. No. 13/912,190, filed Jun. 6, 2013.
Urbanek, Robert E., Subscriber Identity Module Virtualization:, U.S. Appl. No. 14/085,474, filed Nov. 20, 2013.
Krieger, Michael D., et al., "Billing Varied Service Based on Tier", U.S. Appl. No. 14/075,663, filed Nov. 8, 2013.
Paczkowski, Lyle W., et al., "Trusted Display and Transmission of Digital Ticket Documentation", U.S. Appl. No. 14/163,047, filed Jan. 24, 2014.
Loman, Clint H., et al., "Verification of Mobile Device Integrity During Activation", U.S. Appl. No. 14/229,532, filed Mar. 28, 2014.
Paczkowski, Lyle W., et al., "Network Based Temporary Trust Extension to a Remote or Mobile Device Enabled via Specialized Cloud Services", U.S. Appl. No. 14/446,330, filed Jul. 29, 2014.
Cordes, Kevin R., et al., "Digest of Biographical Information for an Electronic Device with Static and Dynamic Portions", U.S. Appl. No. 13/857,141, filed Apr. 4, 2013.
Cordes, Kevin R., et al., "Radio Frequency Identity (RFID) Chip Electrically and Communicatively Coupled to Motherboard of Mobile Communication Device", U.S. Appl. No. 13/857,139, filed Apr. 4, 2013.
Cordes, Kevin R., et al., "System for Managing a Digest of Biographical Information Stored in a Radio Frequency Identity Chip Coupled to a Mobile Communication Device", U.S. Appl. No. 13/857,138, filed Apr. 4, 2013.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", U.S. Appl. No. 13/482,731, filed May 29, 2012.
Cope, Warren B., et al., "Alternative hardware and Software Configuration for Near Field Communication", U.S. Appl. No. 13/463,797, filed May 4, 2012.
Cope, Warren B., et al., "Multiple Secure Elements in Mobile Electronic Device with Near Field Communication Capability", U.S. Appl. No. 13/440,980, filed Apr. 5, 2012.
Bye, Stephen James, et al., "Near Field Communication Authentication and Validation to Access Corporate Data", U.S. Appl. No. 13/463,801, filed May 3, 2012.
Katzer, Robin D., et al., "Web Server Bypass of Backend Process on Near Field Communications and Secure Elements Chips", U.S. Appl. No. 13/470,203, filed May 11, 2012.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", U.S. Appl. No. 13/294,177, filed Nov. 11, 2011.
McRoberts, Leo Michael, et al., "End-to-End Trusted Communications Infrastructure", U.S. Appl. No. 13/532,588, filed Jun. 25, 2012.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", U.S. Appl. No. 13/533,969, filed Jun. 27, 2012.
Bye, Stephen James, et al., "Systems and Methods for Provisioning and Using Multiple Trusted Security Zones on an Electronic Device", U.S. Appl. No. 13/571,348, filed Aug. 10, 2012.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", U.S. Appl. No. 13/762,319, filed Feb. 7, 2013.
Cope, Warren B., et al., "Extended Trusted Security Zone Radio Modem", U.S. Appl. No. 13/540,437, filed Jul. 2, 2012.
Katzer, Robin D., et al., "Trusted Access to Third Party Applications Systems and Methods", U.S. Appl. No. 13/557,213, filed Jul. 25, 2012.
Paczkowski, Lyle W., et al., "System and Methods for Trusted Internet Domain Networking", U.S. Appl. No. 13/610,856, filed Sep. 11, 2012.
Paczkowski, Lyle W., et al., "Trusted Security Zone Access to Peripheral Devices", U.S. Appl. No. 13/556,200, filed Jul. 24, 2012.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, U.S. Appl. No. 13/844,357, filed Mar. 15, 2013.
Paczkowski, Lyle W., et al., "Trusted Security Zone Communication Addressing on an Electronic Device", U.S. Appl. No. 13/844,145, filed Mar. 15, 2013.
Bye, Stephen James, et al., "Protection for Multimedia Files Pre-Downloaded to a Mobile Device", U.S. Appl. No. 13/863,376, filed Apr. 15, 2013.
Paczkowski, Lyle W., et al., "Point-of-Sale and Automated Teller Machine Transactions Using Trusted Mobile Access Device", U.S. Appl. No. 13/802,383, filed Mar. 13, 2013.
Paczkowski, Lyle W., et al., "Trusted Security Zone Re-Provisioning and Re-Use Capability for Refurbished Mobile Devices", U.S. Appl. No. 13/831,486, filed Mar. 14, 2013.
Paczkowski, Lyle W., et al., "Trusted Security Zone Enhanced with Trusted Hardware Drivers", U.S. Appl. No. 13/802,404, filed Mar. 13, 2013.
Paczkowski, Lyle W., et al., "Restricting Access of a Portable Communication Device to Confidential Data or Applications via a Remote Network Based on Event Triggers Generated by the Portable Communication Device", U.S. Appl. No. 13/844,282, filed Mar. 15, 2013.

(56) References Cited

OTHER PUBLICATIONS

Paczkowski, Lyle W., et al., "JTAG Fuse Vulnerability Determination and Protection Using a Trusted Execution Environment", U.S. Appl. No. 13/844,325, filed Mar. 15, 2013.
Bye, Stephen James, et al., "Delivering Digital Content to a Mobile Device via a Digital Rights Clearing House", U.S. Appl. No. 13/860,338, filed Apr. 10, 2013.
Paczkowski, Lyle W., et al., "Method for Enabling Hardware Assisted Operating System Region for Safe Execution of Untrusted Code Using Trusted Transitional Memory", U.S. Appl. No. 13/898,435, filed May 20, 2013.
Paczkowski, Lyle W., et al., "Verifying Applications Using a Trusted Security Zone", U.S. Appl. No. 13/964,112, filed Aug. 12, 2013.
Paczkowski, Lyle W., et al., "Mobile Access Terminal with Local Call Session Control Function", U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp. jsp?tp=&arnumber= 1617569.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", U.S. Appl. No. 14/148,714, filed Jan. 6, 2014.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", U.S. Appl. No. 14/090,667, filed Nov. 26, 2013.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.

(56) References Cited

OTHER PUBLICATIONS

Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.

\* cited by examiner

500
TRUSTED SECURITY ZONE CONTAINERS FOR THE PROTECTION AND CONFIDENTIALITY OF TRUSTED SERVICE MANAGER DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of content, for example media files, electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information.

SUMMARY

A method for providing access to a trusted security zone container within a trusted security zone is disclosed. The method comprises receiving, by an application, trusted service manager validation data from a trusted service manager, wherein the trusted service manager validation data is associated with the trusted service manager. The method further comprises receiving, by the application, a trusted security zone master key, wherein the trusted security zone master key provides access to a plurality of trusted security zone containers within the trusted security zone. The method also comprises hashing, by the application, the trusted service manager validation data with the trusted security zone master key to generate a trusted security zone sub key configured to provide access to a set of one or more trusted security zone containers of the plurality of trusted security zone containers, wherein the hashing is completed using a one-way secure hash function. The method comprises generating, by the application, the trusted security zone sub key based on hashing to access the set of one or more trusted security zone containers. The method further comprise transmitting one or more signals to provision the set of one or more trusted security zone containers with the trusted security zone sub key. The method also comprises providing, by the application, the trusted security zone sub key to the trusted service manager so that the trusted service manager may access the set of one or more trusted security zone containers.

A method for generating a trusted security zone sub key dedicated to a specific set of one or more trusted security zone containers within a trusted security zone is disclosed. The method comprises receiving, by an application, trusted service manager validation data from a trusted service manager, wherein the trusted service manager validation data is generated by a master trusted service manager and associated with the trusted service manager. The method further comprises receiving, by the application, a trusted security zone master key, wherein the trusted security zone master key provides access to a plurality of trusted security zone containers within the trusted security zone. The method also comprises generating, by the application, the trusted security zone sub key by hashing the trusted service manager validation data with the trusted security zone master key, wherein the trusted service manager validation data directs the application to generate a trusted security zone sub key dedicated to the set of one or more trusted security zone containers of the plurality of trusted security zone containers, and wherein the hashing is completed using a one-way secure hash function.

A method for protecting data of two or more different trusted service managers stored in a trusted security zone is disclosed. The method comprises validating a first trusted service manager, wherein validating the first trusted service manager comprises obtaining one or more service manager server credentials. The method further comprises providing a trusted security zone key to the first trusted service manager in response to validating the first trusted service manager, wherein the first trusted service manager uses the trusted security zone key to access a first set of one or more trusted security zone containers. The method also comprises receiving, by an application, a second trusted service manager validation data associated with a second trusted service manager. The method comprises receiving, by the application, the trusted security zone master key, wherein the trusted security zone master key provides access to a plurality of trusted security zone containers within the trusted security zone. The method further comprises hashing, by the application, the second trusted service manager validation data with the trusted security zone master key to generate a trusted security zone sub key configured to provide access to a second and different set of one or more trusted security zone containers of the plurality of trusted security zone containers, wherein the hashing is completed using a one-way secure hash function. The method also comprises generating, by the application, the trusted security zone sub key based on hashing to provide to the second trusted service manager access to the second set of one or more trusted security zone containers. The method comprises transmitting one or more signals to provision the second set of one or more trusted security zone containers with only the trusted security zone sub key so that first trusted service manager may not access the second set of one or more containers with the trusted security zone master key. The method further comprises providing, by the application, the trusted security zone sub key to the second trusted service manager so that the second trusted service manager may access the second set of one or more trusted security zone containers.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
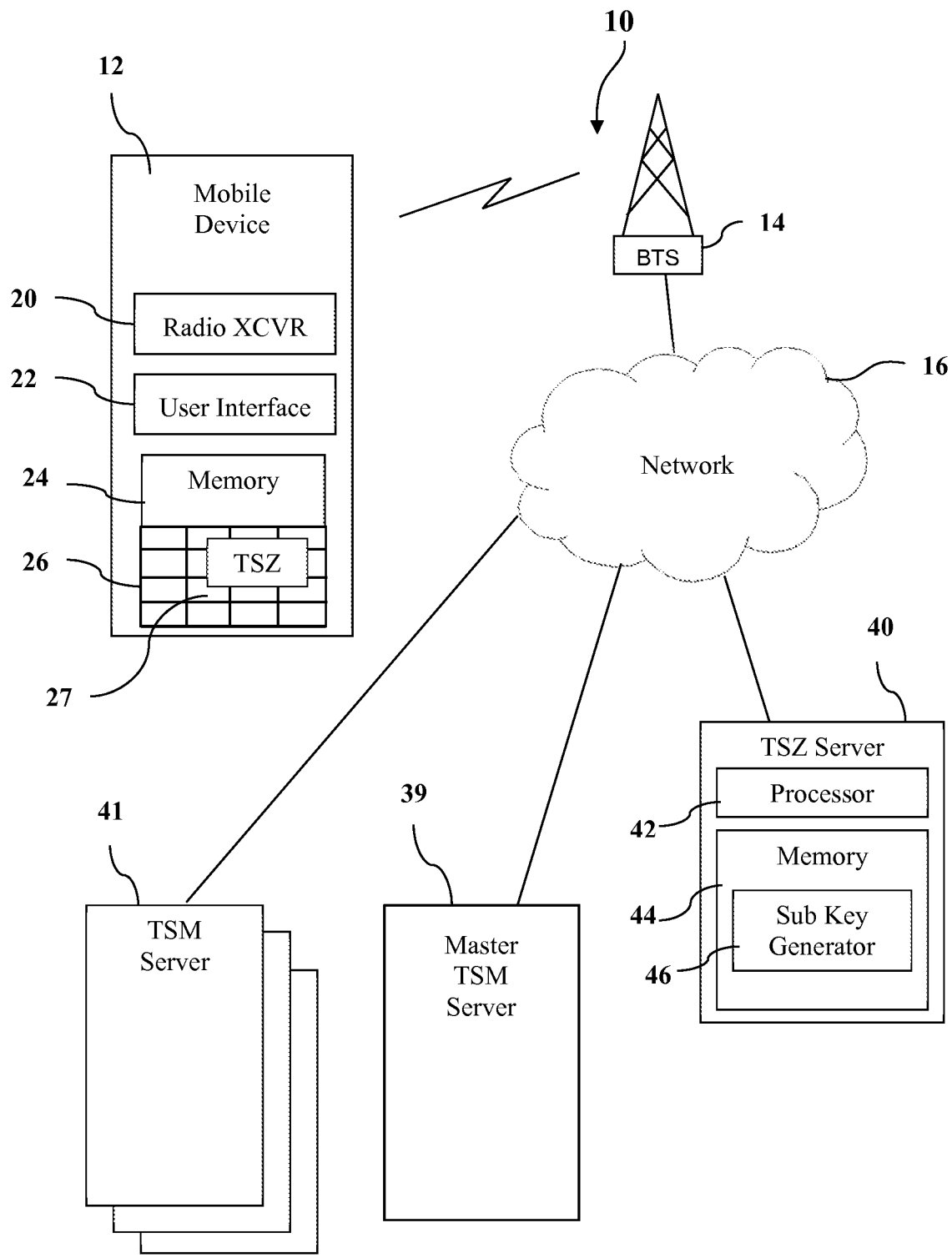
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The use of trusted security zones gives a carrier (e.g. master trusted service manager) the opportunity to invite a trusted service manager (e.g. a third party) to store confidential information, for example, in a hand set serviced by the carrier. However, when multiple trusted service managers desire to use the trust security zone to store and protect confidential information from entities operating externally to the trusted security zone, the multiple trusted service managers may protect confidential information from entities operating externally to the trusted security zone. However, the trusted service managers storing and protecting confidential information on the trusted security zone may expose their confidential information to each other. The present disclosure provides systems and methods which may allow multiple trusted service managers to store and protect confidential information from entities operating externally to the trusted security zone as well as other trusted service managers storing and protect confidential information within the trusted security zone. This may be accomplished by dividing the trusted security zone into containers which may be accessed only by the master trusted service manager (e.g. Sprint) and a specific trusted service manager (e.g. a bank) so that other trusted service managers (e.g. a mortgage lender) utilizing the trusted security zone may not view and/or access the confidential information of the specific trusted service manager. Additionally, the other trusted service managers may also prevent the specific trusted service manager from viewing and/or accessing their confidential information as well.

The present disclosure provides systems and methods for providing access for multiple trusted service managers to a single trusted security zone on, for example a mobile device. Multiple trusted service managers (e.g. trusted server manager servers) may be given access to a set of one or more containers within the trusted security zone. This may allow the trusted service managers to store data packages on the trusted security zone concealing and protecting the data packages from outside entities. Additionally, this may allow the trusted service managers to conceal and/or protect the data packages from other trusted service managers also storing data packages in the same trusted security zone but, for example, in different containers.

This may be accomplished by generating trusted service manager validation data from a master trusted service manager (e.g. Sprint) and presenting the validation data, for example, in the form of a token, to a sub key generator application. A master trusted service manager may use one or more credentials from a service manager in order to validate the service manager as a trusted service manager before generating the token to be presented to the sub key generator application. A master key which provides access to every container within the trusted security zone may also be presented to the sub key generator application. Upon receiving both the token and the master key, the sub key generator may hash both the token and master key to generate a trusted security zone sub key which may be used to provide access by a particular trusted service manager to a particular set of one or more unoccupied containers in the trusted security zone. For example, the master key may be hashed with trusted service manager validation data for example, user specific information or user input information, to generate a sub key. The hashing may be completed using a one-way secure cryptographic hash function, for instance one of MD5, SHA-0, SHA-1, SHA-2, SHA-3, or other well-known one-way secure cryptographic hash functions. Hereinafter, a one-way secure cryptographic hash function may be referred to more concisely as a hash function or a hashing function. The use of a one-way secure hash function may prevent the determination of the master key and/or the sub key by outside entities and/or other entities sharing the trusted security zone at large. The sub key may not be determined from the master key by a deterministic algorithm, because of the hashing operation that employs not only the master key but also some information contributed by the user or specific to the user. Likewise, the master key may not be determined from a sub key by a deterministic algorithm. Additionally, a first sub key generated based on the master key may not be determined from a second sub key generated from the same master key by a deterministic algorithm.

The use of the sub key generator application may prevent the determination of a sub key intended for a second trusted service manager by a first trusted service manager who may be holding and issuing the master key to the sub key generator application because the first trusted service manager would never see the sub key. Additionally, the use of the sub key generator application may prevent a second trusted service manager from determining the master key held and issued by, for example, a first trusted service manager because the master key is not shared with the second trusted service manager. Furthermore, a master trusted service manager retains a master trusted service manager master key so that the master trusted service manager retains access to all containers within a trusted security zone, both occupied and unoccupied.

The sub key generator application may be located on the mobile device or on a network server in communication with the mobile device. The sub key may be associated with one or more containers of a trusted security zone. The containers may be configured so that only a specific sub key may be used to access a set of one or more containers.

Throughout the lifespan of a mobile device, it may be refurbished or reused and may be passed from one user to the next. For example, a first user may wish to change devices, such as for an upgrade, and may surrender the first device back to the provider of the device. The provider may then refurbish the device so that it may be resold or reissued to a second user. The refurbish process may include returning the device to factory settings. In the case where the mobile device comprises a trusted security zone, a second user may not be able to access the trusted security zone or applications executed in the trusted security zone, because it would have already been personalized by the first user. The personalization process may include associating the trust zone master key with the first user of the device. Therefore, it may be desired to alter the personalization process of the trusted security zone such that multiple users may be able to access and execute in the trusted security zone of a mobile device.

This may be accomplished by generating multiple user specific trust zone keys which may be used in place of the trust zone master key. For example, the trust zone master key may be hashed with user specific information or user input information to generate a new user specific trust zone key. For example, the trust zone master key and the user information may be used as seeds or other inputs to the execution of a hashing function or algorithm to generate the new user specific trust zone key. The hashing may be completed using a one-way secure cryptographic hash function, for instance one of MD5, SHA-0, SHA-1, SHA-2, SHA-3, or other well-known one-way secure cryptographic hash functions. Hereinafter a one-way secure cryptographic hash function may be referred to more concisely as a hash function or a hashing function. The use of a one-way secure hash function may prevent the determination of the trust zone master key and/or the user specific key by outside entities. The user specific key may not be determined from the master key by a deterministic algorithm, because of the hashing operation that employs not only the master key but also some information contributed by the user or specific to the user. Likewise, the master key may not be determined from a user specific key by a deterministic algorithm. Additionally, a first user specific key generated based on the master key may not be determined from a second user specific key generated from the same master key by a deterministic algorithm.

The user specific keys may be generated by an application on the mobile device or an application on a network server in communication with the mobile device. The user specific key may be associated with a user of the mobile device and may be used to verify the identity of the user and/or mobile device when executing secure applications in the trusted security zone. Then, if the device is returned to factory settings, the personalization process may be repeated, and a second user specific trust zone key may be generated and used by a second user of the mobile device.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

Turning now to FIG. 1, a communication system 10 is described. The system 10 comprises a mobile communication device 12, base transceiver stations (BTS) 14, a network 16, a master trusted service manager server 39, a trusted security zone server 40, and a plurality of trusted service manager servers 41. It is understood that the system 10 may comprise any number of mobile devices 12, any number of base transceiver stations 14, and any number of trusted service manager servers 40. The network 16 may comprise one or more public networks, one or more private networks, or a combination thereof.

The mobile device 12 may comprise a radio transceiver 20, a user interface 22, a memory 24, and a trusted security zone 26. The mobile device 12 may be a mobile phone, a personal digital assistant (PDA), a media player, or other communication enabled mobile communication device. In an embodiment, the mobile device 12 may be implemented as a handset. Details of handsets are discussed further hereinafter.

The radio transceiver 20 is configured to establish a wireless communication link with the BTS 14. The BTS 14 may communicatively couple the radio transceiver 20 and/or the mobile device 12 to the network 16 and to devices that are connected to the network 16, for example the trusted security zone server 40. In an embodiment, the radio transceiver 20 and the BTS 14 establish a wireless communication link according to one of a code division multiple access (CDMA) wireless protocol, a global system for mobile communication (GSM) wireless protocol, a long term evolution (LTE) wireless protocol, a worldwide interoperability for microwave access (WiMAX) wireless protocol, or another wireless communication protocol.

The user interface 22 of the mobile device 12 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 12. The microphone may receive voice and/or audio from a user and/or communicate audio to a user. In an embodiment, a user may utilize the user interface 22 to communicate with the mobile device 12, for example, to initiate the execution of a device application and/or a secure application. Additionally, a user may receive communication from the mobile device 12 via the user interface 22, such as messages, emails, contact information, caller identification, call history, internet access, etc. A user may additionally employ the user interface 22 for viewing and/or listening to media such as music, movies, shows, videos, photos, games etc.

The trusted security zone 26 may store one or more data packages (e.g. data, logic instruction, and/or the like) associated with at least one of the plurality of trusted service manager servers 41. In an embodiment, the trusted security zone 26 may be physical and/or virtual partitioned sections of the memory 24. Additionally, the trusted security zone 26 may be a completely separate memory of the mobile device 12 from memory 24. The trusted security zone 26 may store a variety of applications that process and/or transmit confidential information. The confidential information may comprise sensitive business documents such as electronic mail, marketing literature, business plans, client lists, addresses, employee data, intellectual property documents, and the like. The confidential information may comprise personal medical records or medical data that are subject to privacy requirements enforced by government regulatory bodies or commercial standards. The confidential information may comprise financial information such as account numbers, authentication identities, account balance information, and the like. The confidential information may comprise confidential, secret, and/or top secret defense and/or law enforcement information.

In an embodiment, the trusted security zone 26 may be provided in a secure area of a processor and/or memory chip shared with a permissive sector, such as memory 24, or in a separate processor and/or memory chip. The trusted security zone 26 may be provided as what may be conceptualized as "invisible space." In an embodiment, at least some of the memory addresses occupied by the trusted security zone 26 may be inaccessible to device applications executing out of the permissive sector. This demarcation of accessible memory addresses versus inaccessible memory addresses may be provided by the operating system of the mobile device 12. In an embodiment, the trusted security zone 26 may encapsulate a trusted execution environment (TEE), for example conforming at least partially to the Global Platform 2.0 or later revision trusted execution environment standard. It is understood, however, that the trusted security zone 26 is contemplated to provide further functionality than that envisioned by the trusted execution environment standards.

The trusted security zone 26 may comprise a plurality of trusted security zone containers 27 (hereinafter "containers"). The container 27 may be a sectioned-off space and/or partition of the trusted security zone 26 that isolates, shields, and/or conceals one or more data packages stored in the container 27. A plurality of trusted service manager servers 41 may store and/or desire to store one or more data packages in a container 27 on the trusted security zone 26. For example, a first trusted service manager server 41 may be currently storing one or more confidential data packages on the trusted security zone 26. Additionally, a second trusted service manager server 41 may desire storing one or more confidential data packages in the trusted security zone 26 of the mobile device 12. Because the trusted security zone 26 comprises a plurality of containers 27, the first trusted service manager server 41 can store one or more data packages in a first container 27 of the trusted security zone 26 while the second trusted service manager server 41 can store one or more data packages in a second container 27 of the trusted security zone 26. Furthermore, because the first and second trusted service manager servers 41 are storing data in different containers 27, the first trusted service manager server 41 may shield and/or conceal its package(s) from the second trusted service manager server 41 and conversely the second trusted service manager server 41 may shield and/or conceal its package(s) from the first trusted service manager server 41. The shielding and/or concealing may be accomplished due to the characteristics of the trusted security zone 26 and the individual containers 27 of the trusted security zone 26. Thus, both the first trusted service manager server 41 and the second trusted service manager server 41 may store confidential data packages in a trusted security zone 26 of a mobile device 12 and shield and/or conceal the confidential data packages from entities, for example nefarious entities, outside the trusted security zone 26 as well as each other. Additionally, although the embodiment of FIG. 1 depicts sixteen containers 27 in the trusted security zone 26, the trusted security zone 26 may be sectioned into two or more containers 27.

As will be discussed further herein, a master key may provide access to the trusted security zone 26 so that a first trusted service manager 41 may access all containers 27 occupied by the first trusted service manager 41 as well as all unoccupied containers 27 in the trusted security zone 26. Additionally, a sub key may provide access to the trusted security zone 26 so that a second trusted service manager 41 may access one or more containers 27 assigned to the second trusted service manager 41. For purposes of this disclosure, the terms "occupied" and "unoccupied" may indicate whether a trusted service manager server 41 has stored one or more data packages in a container 27 of the trusted security zone 26 and/or whether a trusted service manager server 41 has been given access or permission to store one or more data packages in a particular container 27 of the trusted security zone 26.

The system also comprises a master trusted service manager server 39. The master trusted service manager server 39 has control and/or access to each and every container 27 of the trusted security zone 26. The master trusted security zone server 39 may provide a master key to a first trusted service manager server 41 and may also provide trusted service manager server validation data, for example, in the form of token, validating one or more trusted service manager servers 41 for access to a set of one or more containers 27 in the trusted service zone 26. In an embodiment, the master trusted service manager server 39 may also retain its own master key, for example a master trusted service manager master key, which may provide access to all containers 27 in a trusted security zone 26 both occupied and unoccupied. For example, even if the first trusted service manager server 41 and the second trusted service manager server 41 have confidential data packages stored in different containers 27 of the trusted security zone 26 concealing and/or protecting the packages from each other and outside entities, the master trusted manager server 39 may access, view, and/or remove (e.g. delete) any or all data packages stored in any one container 27 using the master trusted service manager master key. Additionally, the master trusted manager server 39 may validate that a service manager server is a trusted service manager server 41. For example, by examining one or more applications for incompatibility, spy-ware, and/or any other nefarious activities, the master trusted service manager server 39 may validate entire trusted service manager servers 41 such that all application stored on the trusted security zone 26 from a particular trusted service manager server 41 are validated. The master trusted service manager server 39 may also validate individual applications from trusted service manager servers 41 for enhanced trust and/or reassurance that all applications to be stored on the trusted security zone 26 from a particular trusted service manager server 41 are trusted. It should be understood that a multitude of service manager servers 41 may be connected to a network, such as network 16. A service manager server 41 may not be permitted to store data packages in the trusted security zone 26 without first being validated by the master trusted service manager server 39.

The master trusted service manager server 39 may examine a series of credentials associated with a service manager server 41 and issue trusted service manager validation data (e.g. a token) to the service manager server 41 so that the service manager server is a trusted service manager server 41. The credentials may comprise trusted service manager server 41 and/or application compatibility, one or more trusted service manager server identification codes, a certification that the trusted service manager server 41 produces data packages free from spy-ware, mal-ware, and/or the like, and the amount of memory space that trusted service manager server 41 requires. Therefore, in the event that a service manager server 41 which is not trusted and/or is trusted but does not receive a token from the master trusted service manager server 39 validating that the trusted service manager server 41 is a trusted service manager server, then the trusted service manager server 41 will be rejected and/or denied a sub key and thus denied access to the trusted security zone 26 if service manager server attempts to access the trusted security zone 26, as will be discussed further herein. Additionally, the master trusted service manager server 39 may put a time limit or a limited number of attempts on the token so that if the token is used after a predetermined amount of time or predetermined number of attempts, the holder of the token may not be able to obtain a sub key and/or gain access to the trusted security zone 26. For example, a master trusted service manager server 39 may provide a token to a trusted service manager server 41. The token may be configured so that it expires after the first attempted access to obtain a sub key as well as after one day from receiving the token. Thus, if a nefarious server and/or application obtains the token, the nefarious server and/or application may be limited as to how and/or when the token is used. In this embodiment, the trusted service manager server 41 may have to obtain a new token and thus a new sub key each time the trusted service manager server 41 desires to access a set of one or more containers 27 in the trusted security zone 26.

The trusted security zone server 40 may comprise a processor 42, a memory 44, and a sub key generator application 46 stored in the memory 44. The trusted security zone server 40 may also comprise a plurality of processors located in a plurality of computers. Computers are discussed in more detail hereinafter. In an embodiment, the master trusted service manager server 39 may comprise the trusted security zone server 40 such that the sub key generator application 46 is stored on the master trusted service manager server 39. The sub key generator application 46 may be configured to generate a sub key providing access such that a trusted service manager server 41 may store one or more data packages in a particular set of one or more containers 27 on the trusted security zone 26. For example, the master trusted service manager server 39 may provide a token to a first trusted service manager server 41 validating the first trusted service manager server 41. The token may identify that the first trusted service manager server 41 has been validated by the master trusted service manager server 39. The first trusted service manager server 41 may present the token to the sub key generator 46 showing the sub key generator 46 that the first trusted service manager server 41 has been validated. Upon receiving the token, the sub key generator 46 may generate a sub key providing access to a particular set of one or more containers 27 in the trusted security zone 26. Generally, the sub key generator 46 may generate a sub key providing access to one or more unoccupied containers 27, so that the first trusted service manager server 41 does not expose data packages to other trusted service manager servers 41 storing data packages in other containers 27 on the trusted security zone 26. In an embodiment, a trusted service manager server 41, such as the first trusted service manager server 41 may choose any unoccupied containers 27 of the trusted security zone 26 to store one or more data packages.

In an embodiment, the sub key generator 46 may generate a sub key after receiving both a token from a validated trusted service manager server 41 and the master key. For example, the master trusted service manager server 39 may have previously provided the master key to a first trusted service manager server 41 along with a set of one or more containers in the trusted security zone 26. Subsequently, the master trusted service manager server 39 may provide a token to a second trusted service manager server 41 validating the second trusted service manager server 41. The token may identify that the second trusted service manager server 41 has been validated by the master trusted service manager server 39. The second trusted service manager server 41 may present the token to the sub key generator 46 showing the sub key generator 46 that the second trusted service manager server 41 has been validated. Additionally, the first trusted service manager server 41 may present the master key to the sub key generator 46, for example in response to the master trusted service manager server 39 sending a signal to the first trusted service manager server 41 that a token has been issued to the second trusted service manager server 41 and/or that the second trusted service manager server 41 has presented a token to the sub key generator 46. In an embodiment, the sub key generator 46 may send a signal to the first trusted service manager server 41 requesting the master key in response to receiving the token from the second trusted service manager server 41.

Upon receiving the token and the master key, the sub key generator 46 may hash the master key with the token, for example, user specific information or user input information, to generate a sub key. For example, the master key and the token may be used as seeds or inputs to a hashing function or algorithm to generate the sub key. The hashing may be completed using a one-way secure cryptographic hash function, for instance one of MD5, SHA-0, SHA-1, SHA-2, SHA-3, or other well-known one-way secure cryptographic hash functions. Hereinafter, a one-way secure cryptographic hash function may be referred to more concisely as a hash function or a hashing function. The use of a one-way secure hash function may prevent the determination of the master key and/or the sub key by outside entities. The sub key may not be determined from the master key by a deterministic algorithm, because of the hashing operation that employs not only the master key but also some information contributed by the user or specific to the user. Likewise, the master key may not be determined from a sub key by a deterministic algorithm. Additionally, a first sub key generated based on the master key may not be determined from a second sub key generated from the same master key by a deterministic algorithm.

In an embodiment, the sub key generator 46 may also determine which trusted service manager servers 41 occupy particular containers 27 and assign unoccupied containers to a new trusted service manager server 41 or a trusted service manager server 41 which needs an additional set of one or more containers 27. Thus, when the trusted service manager server 41 presents a token to the sub key generator 46, the sub key generator 46 will make an inventory of which trusted service manager server 41 are currently occupying which containers 27 and determine which containers 27 are unoccupied in order to generate a sub key configured to provide access to a particular set of one or more unoccupied containers 27 for the trusted service manager server 41 presenting the token. Alternatively, the master trusted service manager server 39 may determine which trusted service manager server 41 occupy particular containers 27 and assign unoccupied containers 27 to a new trusted service manager server 41 or a trusted service manager server 41 which needs an additional set of one or more containers 27. For example, when a trusted service manager server 41 receives a token from the master trusted service manager server 39, the master trusted service manager server 39 may have previously performed an inventory of which trusted service manager server 41 are currently occupying which containers 27 and determines which containers 27 are unoccupied so that token given to the trusted service manager server 41 also contains information indicating that the sub key to be generated by the sub key generator 46 will be configured specifically for a particular set of one or more containers 27. Thus, when the trusted service manager server 41 presents the token to the sub key generator 46, the sub key generator 46 may generate a sub key which provides access for the trusted service manager server 41 only to the particular set of one or more containers 27.

In an embodiment, the sub key generator 46 and/or the trusted security zone server 40 may send one or more signals to the trusted security zone 26 in order to configure and/or provision the set of one or more containers 27 assigned to the sub key of a trusted service manager server 41. For example, upon receiving the token from a second trusted service manager server 41 and the master key from a first trusted service manager server 41, the sub key generator 46 may transmit a signal to the set of one or more containers 27 in the trusted security zone 26 assigned to the second trusted service manager server 41. The signal may configure the set of one or more containers 27 so that the sub key may allow the second trusted service manager server 41 to access those containers 27. In an embodiment, because the sub key may access the particular set of one or more containers 27 assigned to the second trusted service manager server 41, the master key held by the first trusted service manager server 41 may no longer provide access to the container assigned to the second trusted service manager server 41.

Alternatively, the master trusted service manager server 39 may send one or more signals to the trusted security zone 26 in order to configure and/or provision the set of one or more containers 27 assigned to the sub key of a trusted service manager server 41. For example, the master trusted service manager server 39 may determine which container(s) 27 are to be assigned to a particular trusted service manager server 41 such as the second trusted service manager server 41. Upon providing a token to the second trusted service manager server 41, the master trusted service manager server 39 may send one or more signals to the trusted security zone 26 in order to configure and/or provision the set of one or more containers 27 assigned to the second trusted service manager server 41.

In addition to configuring and/or provisioning the set of one or more containers to a sub key for a trusted service manager server 41, the one or more signals may also provide a time limit or a limit on the number of attempts by which a trusted service manager server 41 may access the set of one or more containers with the given sub key. For example, master trusted service manager server 39 may determine that a second trusted service manager server 41 may access a set of one or more containers 27 on the trusted security zone 26 for exactly one year after obtaining a sub key. The master trusted service manager server 39 server may send a signal provisioning the set of one or more containers 27 designated for the second trusted service manager server 41 which makes the containers 27 compatible with a sub key for exactly one year. Once the time limit expires, the master trusted service manager server 39 and/or the first trusted service manager server 41 (e.g. the trusted service manager server with the master key) may reclaim the set of one or more containers and may delete, access, and/or view, for example, all the data packages stored in that set of one or more containers. Additionally, if the second trusted service manager server 41 desires to extend the time limit past the year, the second trusted service manager server 41 may obtain another token from the master trusted service manager server 39 server in order to obtain another sub key from the sub key generator 46. The same example may apply to limiting the number of access attempts.

The combination of the sub key generator 46 and the plurality of containers 27 in the trusted security zone 26 allows a trusted service manager server 41 to store and secure confidential data packages in a trusted security zone 26 not only from outside entities, but from other trusted service manager server 41 also storing data packages the same trusted security zone 26. This is accomplished because a first trusted service manager server 41 holding the master key never sees the sub key generated by the sub key generator 46. Thus, the first trusted service manager server 41 never knows how to access the set of one or more containers 27 assigned to the second trusted service manager server 41. Additionally, the second trusted service manager server 41 holding the token at one time and the sub key at a different time, never sees the master key given to the sub key generator 46 from the first trusted service manager server 41. Thus, the second trusted service manager server 41 never knows how to access the set of one or more containers 27 assigned to the first trusted service manager server 41 or unoccupied by a trusted service manager server 41.

Figure 2:
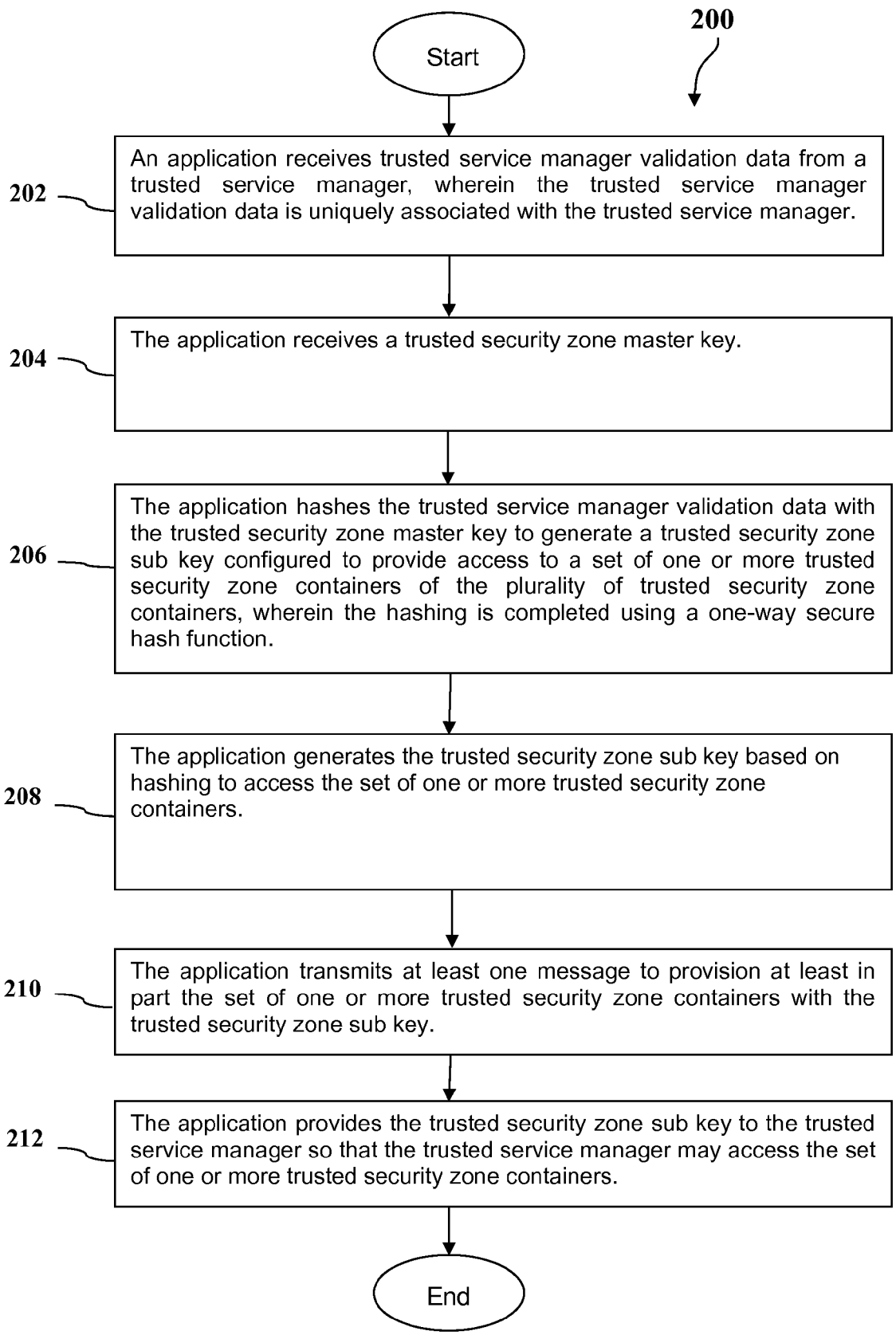
FIG. 2 is a flow chart illustrating a method according to an embodiment of the disclosure.

FIG. 2 illustrates a method 200 for providing access to a trusted security zone container 27, according to an embodiment of the disclosure. The method 200 comprises, at block 202, that an application may receive trusted service manager validation data from a trusted service manager server 41. As previously disclosed, the trusted service manager validation data may comprise data associated with the trusted service manager server 41. For example, a trusted service manager (e.g. a trusted service manager server 41) may receive a token, from the master trusted service manager server 39, validating the trusted service manager server 41 based on criteria which certifies, by the master trusted service manager server 39, that trusted service manager server 41 may be trusted. An application such as the sub key generator 46 may receive the token from the trusted service manager server 41. The token may comprise instructions to the application to generate a sub key configured to provide access to a set of one or more containers 27 in the trusted security zone 26. In an embodiment, the token may comprise instructions to the application to generate a sub key configured to provide access to a specific set of one or more containers 27 in the trusted security zone 26. In an embodiment, the token may be configured such that after a predetermined amount of time and/or a predetermine number of attempts, the token may be rejected by the application.

Then, at block 204, the method comprises that an application may receive a trusted security zone master key, wherein the trusted security zone master key provides access to a plurality of trusted security zone containers 27 within the trusted security zone 26. The trusted security zone master key may be given to the application from a first trusted service manager server 41 or the master trusted service manager server 39. In an embodiment, the plurality of trusted security zone containers 27 may comprise all of the trusted security zone containers 27 within the trusted security zone 26.

At block 206, the method comprises that the application hashes the trusted service manager validation data with the trusted security zone master key to generate a trusted security zone sub key configured to provide access to a set of one or more trusted security zone containers 27 of the plurality of trusted security zone containers 27, wherein hashing is completed using a one-way secure hash function. The hashing may generate a trusted security zone sub key specific to a particular set of one or more containers 27. At block 208, the application may generate a trusted security zone sub key based on the hashing, for example, for the trusted service manager server 41 to access the set of one or more trusted security zone containers 27.

At block 210, one or more signals may be transmitted to the trusted security zone 26 and/or the set of one or more trusted security zone containers 27 which are to be utilized by the trusted service manager server 41 to provision and/or configure the set of one or more containers 27 with the trusted security zone sub key. In an embodiment, the method may comprise transmitting one or more signals putting a time limit and/or a limit on the number of attempts in order to limit access to the set of one or more trusted security zone containers 27 using the sub key. Thus, after a predetermined amount of time and/or a predetermined number of attempts, the trusted security zone sub key may no longer provide access to the set of one or more trusted security zone containers 27. At block 212, the method may comprise that the applications provides the trusted security zone sub key to the trusted service manager server 41 so that trusted service manager server 41 may access the set of one or more trusted security zone containers 27. In an embodiment, the method may further comprise that the trusted service manager server 41 stores one or more confidential data packages in the one or more containers 27 of the trusted security zone 26 isolating, shielding, and/or concealing the one or more confidential data package from applications outside the trusted security zone 26 or other applications or trusted service manager server 41 with access to the trusted security zone 26.

Figure 3:
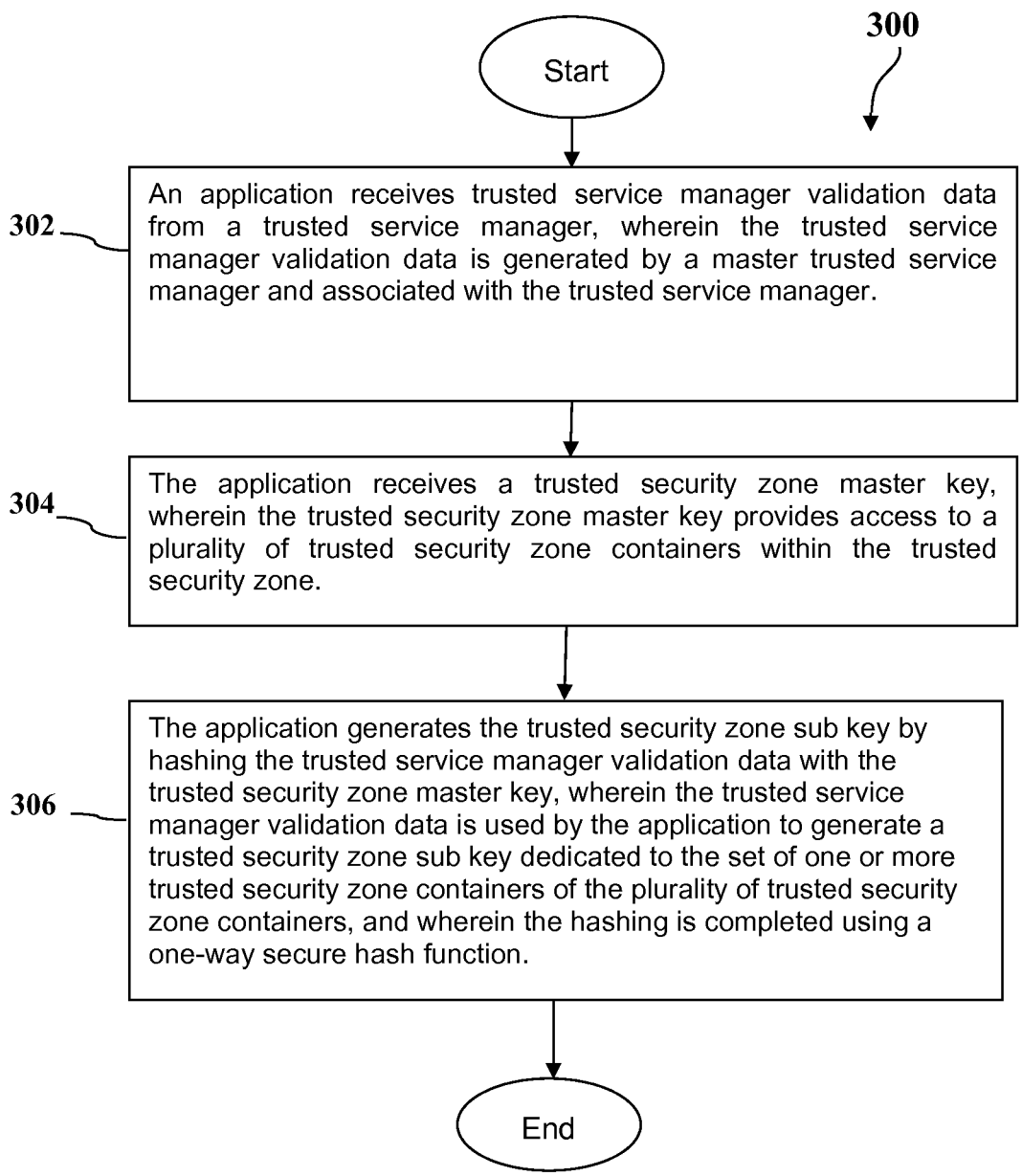
FIG. 3 is a flow chart illustrating another method according to an embodiment of the disclosure.

FIG. 3 illustrates a method 300 for generating a trusted security zone sub key dedicated to a set of one or more trusted security zone containers 27 within a trusted security zone 26, according to an embodiment of the disclosure. The method 300 comprises, at block 302, receiving, by an application, trusted service manager validation data from a trusted service manager server 41, wherein the trusted service manager validation data is generated by a master trusted service manager server 39 and associated with the trusted service manager server 41. In some embodiments, the trusted service manager validation data may have expired, for example, due to exceeding a predetermined number of attempts and/or using the validation data beyond a predetermined amount of time. Thus, when expired validation data is presented to the application, such as a sub key generator 46, the application may reject the validation data. In other embodiments, counterfeit validation data and/or service managers without validation data may also be rejected when a sub key is sought. In an embodiment, the application may generate a sub key which is not configured for any set of one or more containers 27 or may not generate a sub key at all.

At block 304, the method comprises receiving, by the application, a trusted security zone master key, wherein the trusted security zone master key provides access to a plurality of trusted security zone containers 27 within the trusted security zone 26. In an embodiment, the trusted security zone master key may be held by a trusted service manager server 41 which already has access to a set of one or more containers 27 in the trusted security zone 26. Alternatively, the master trusted service manager server 39 may hold the trusted security zone master key such that when the trusted service manager server 41 presents the validation data, the application may receive the trusted security zone master key from the master trusted service manager server 39.

Then, at block 306, the method comprises generating, by the application, the trusted security zone sub key by hashing the trusted service manager validation data with the trusted security zone master key, wherein the trusted service manager validation data directs the application to generate a trusted security zone sub key dedicated to the set of one or more trusted security zone containers 27 of the plurality of trusted security zone containers 27, and wherein the hashing is completed using a one-way secure hash function.

Figure 4A:
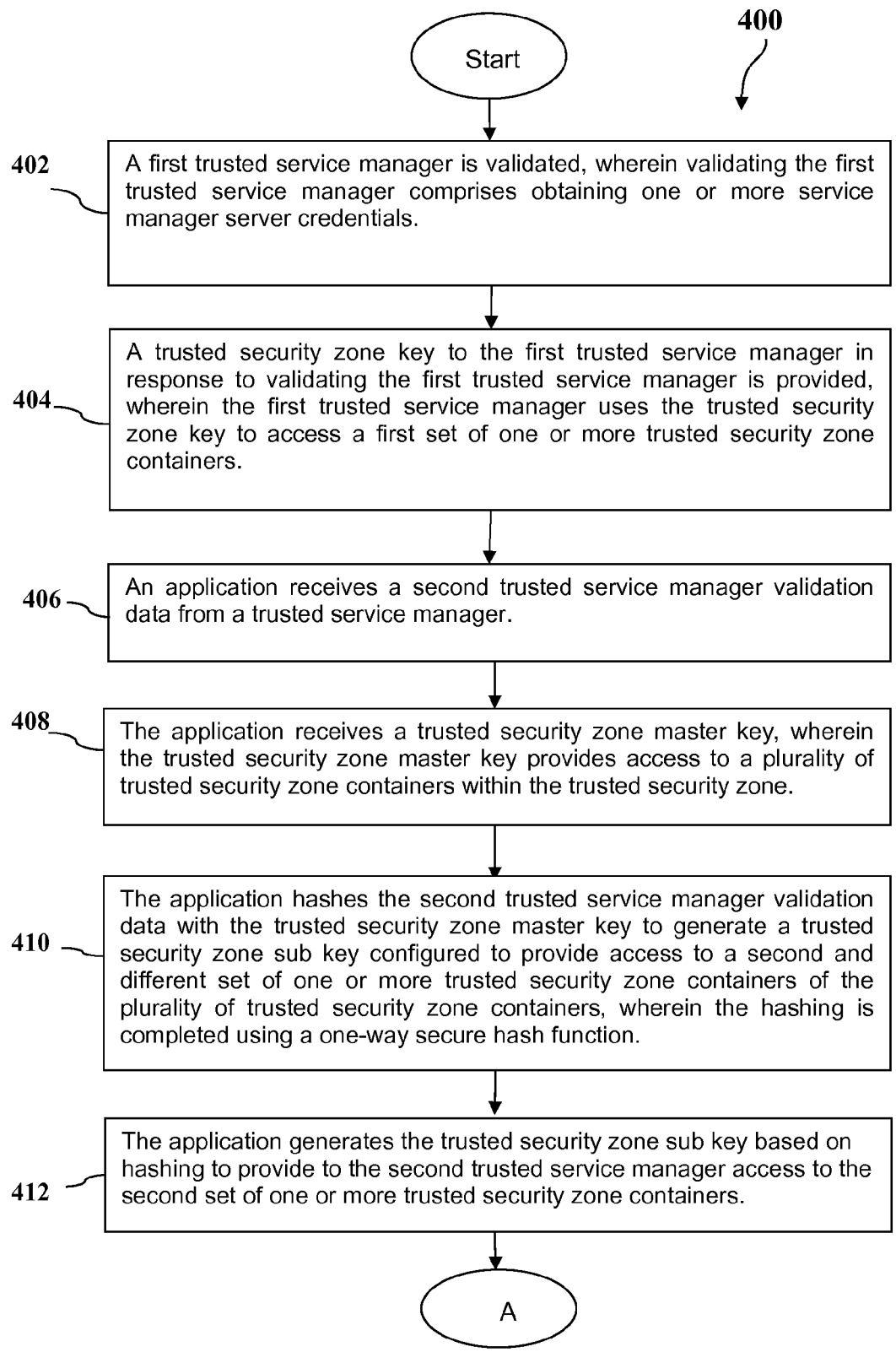
FIGS. 4A and 4B comprise a flow chart illustrating another method according to an embodiment of the disclosure.
Figure 4B:
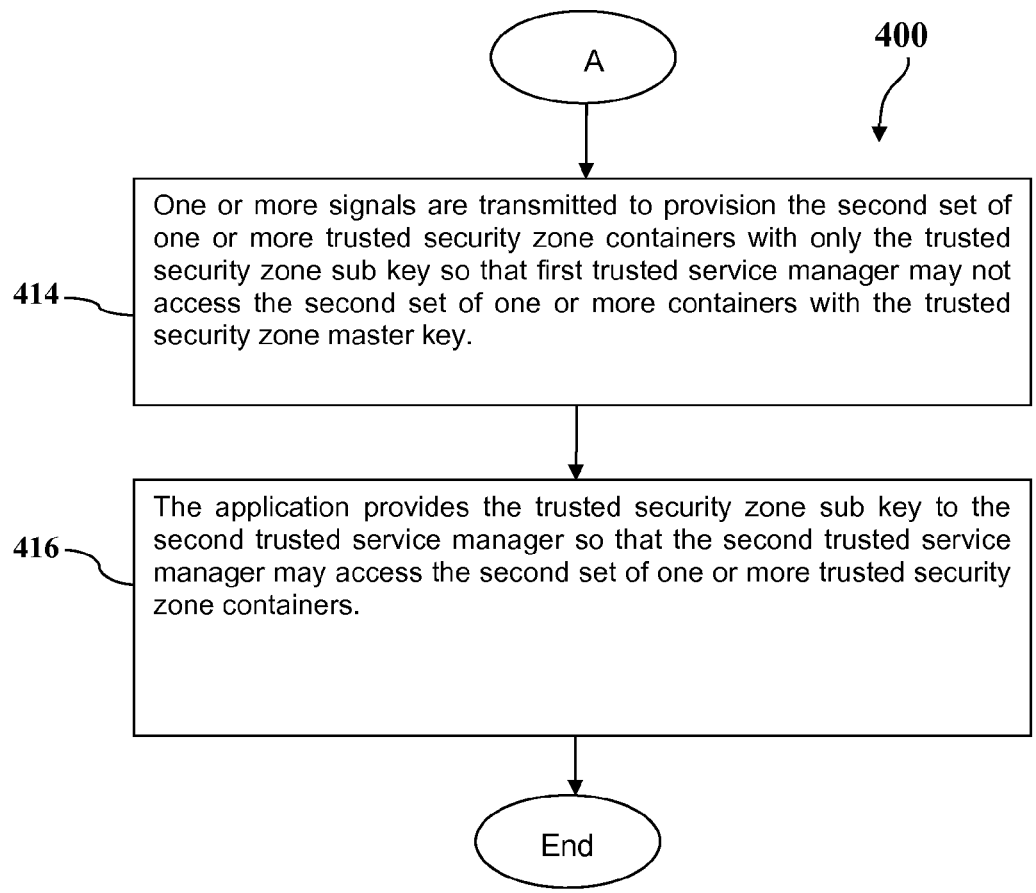

FIG. 4 illustrates a method 400 for protecting data of two or more different trusted service manager servers 41 stored in a trusted security zone 26, according to an embodiment, of the disclosure. The method 400 comprises, at block 402, validating a first trusted service manager server 41 associated with a first trusted service manager, wherein validating the first trusted service manager server 41 comprises obtaining one or more service manager server credentials. For example, the master trusted service manager server 39 may validate that a service manager server is a trusted service manager server 41. In an embodiment, the method may further comprise receiving, by an application, a first trusted service manager validation data associated with a first trusted service manager server 41, where the first trusted service manager validation data is from the master trusted service manager server 39. In an embodiment, when the first trusted service manager server 41 occupies one or more containers in the trusted security zone 26 and/or when the first trusted service manager server 41 possesses the master key or the first sub key, the first trusted service manager server 41 is the first trusted service manager server 41 to have access to any container 27 in the trusted security zone 26. In other words, before the first trusted service manager server 41 is validated, there are no trusted service manager servers 41 with the ability to access the trusted security zone 26.

At block 404, the method comprises providing a trusted security zone key to the first trusted service manager server 41 in response to validating the first trusted service manager server 41, wherein the first trusted service manager server 41 uses the trusted security zone key to access a first set of one or more trusted security zone containers 27. For example, the master trusted service manager server 39 may validate the first trusted service manager server 41 after examining one or more credentials and in response to validating the first trusted service manager server 41, the master trusted service manager server 39 may provide a trusted security zone sub key generated by a sub key generator application 46 stored on the master trusted service manager server 39 to the first trusted service manager server 41. The master trusted service manager server 39 may also send a signal to the trusted security zone 26 configuring and/or provisioning a first set of one or more containers 27 with the trusted security zone sub key provided to the first trusted service manager server 41. In an embodiment, the master trusted service manager server 39 may provide a trusted security zone master key to the first trusted service manager server 41 in response to validating the first trusted service manager server 41. Upon providing the trusted security zone master key to the first trusted service manager server 41, the master trusted service manager server 39 may send a signal to the trusted security zone 26 to configure and/or provision a first set of one or more containers 27 for the first trusted service manager server 41.

In an embodiment, an application stored in the trusted security zone server 40 may provide the trusted security zone master key to the first trusted service manager server 41, in response to the first trusted service manager server 41 presenting validation data to the application. Initially, the trusted security zone master key may be stored and protected in the sub key generator application 46 associated with a particular trusted security zone 26. The master trusted service manager server 39 may transmit a signal, for example within the validation data, instructing the sub key generator application 46 to provide the trusted security zone master key to the first trusted service manager server 41 when the first trusted service manager server 41 presents the validation data to the sub key generator application 46. The master trusted service manager server 39 may also send a configuration and/or provisioning signal to the trusted security zone 26 when the first trusted service manager server 41 is validated or the sub key generator application 46 may send a configuration and/or provisioning signal to the trusted security zone 26 when the sub key generator application 46 provides the trusted security zone master key to the first trusted service manager server 41. Signals from the sub key generator application 46 and/or the master trusted service manager server 39 may configure and/or provision a first set of one or more containers 27 with the first trusted service manager server 41.

In an embodiment, an application stored in the trusted security zone server 40 may provide a trusted security zone sub key to the first trusted service manager server 41, in response to the first trusted service manager server 41 presenting validation data to the sub key generator application 46. The trusted security zone master key may be stored and protected with the master trusted service manager server 39. When the first trusted service manager server 41 (or a subsequent trusted service manager server 41, such as second trusted service manager server 41) presents validation data to a sub key generator application 46, the master trusted service manager server 39 may receive a signal from the sub key generator application 46 to present the trusted security zone master key to the sub key generator application 46. Upon receiving the signal, the master trusted service manager server 39 may also send a configuration and/or provisioning signal to the trusted security zone 26 when the first trusted service manager server 41 is validated or the sub key generator application 46 may send a configuration and/or provisioning signal to the trusted security zone 26 when the sub key generator application 46 provides the trusted security zone sub key to the first trusted service manager server 41. Signals from the sub key generator application 46 and/or the master trusted service manager server 39 may configure and/or provision a first set of one or more containers 27 with the first trusted service manager server 41. Signals from the sub key generator application 46 and/or the master trusted service manager server 39 may configure and/or provision subsequent sets of one or more containers 27 with subsequent trusted service manager server 41.

At block 406, the method comprises receiving, by an application, a second trusted service manager validation data associated with a second trusted service manager server 41. At block 408, the method comprises receiving, by the sub key generator application 46, the trusted security zone master key, wherein the trusted security zone master key provides access to a plurality of trusted security zone containers 27 within the trusted security zone 26. In an embodiment, as previously disclosed, the application may receive the trusted security zone master key from the first trusted service manager server 41 or the master trusted service manager server 39. At block 410, the method comprises hashing, by the application, the second trusted service manager validation data with the trusted security zone master key to generate a trusted security zone sub key configured to provide access to a second and different set of one or more trusted security zone containers 27 of the plurality of trusted security zone containers 27, wherein the hashing is completed using a one-way secure hash function.

In an embodiment, the second trusted service manager server 41 may unilaterally select which containers within the trusted security zone 26 it wants to occupy. Alternatively, the master trusted service manager server 39 and/or the sub key generator application 46 may select which containers within the trusted security zone 26 will be designated for the second trusted service manager server 41. It should be understood that the first trusted service manager server 41 and the sub key generator application 46 may only designate unoccupied containers within the trusted security zone 26 for assignment to subsequent trusted service manager server 41. Conversely, a master trusted service manager server 39 may designate occupied containers (i.e. containers previously assigned to a trusted service manager server 41) for subsequent trusted service manager server 41. However, the master trusted service manager server 39 may remove (e.g. delete) the one or more data packages occupying the occupied container(s) 27 and/or request permission from the trusted service manager server 41 previously assigned to occupy the container(s) 27 to share the container(s) 27 before designating the occupied container(s) 27 to a subsequent trusted service manager server 41.

At block 412, the method comprises generating, by the sub key generator application 46, the trusted security zone sub key based on hashing to provide to the second trusted service manager server 41 access to the second set of one or more trusted security zone containers 27. At block 414 (FIG. 4B), the method comprises transmitting one or more signals to provision the second set of one or more trusted security zone containers 27 with only the trusted security zone sub key so that first trusted service manager server 41 may not access the second set of one or more containers 27 with the trusted security zone master key. The signal may be transmitted from the sub key generator application 46 in response to generating the trusted security zone sub key for the second trusted service manager server 41 or the signal may be transmitted from the master trusted service manager server 39 in response to validating the second trusted service manager server 41. In an embodiment, the signal may be sent by the entity taking inventory over which servers occupy which containers 27 of the trusted security zone 26. At block 416, the method comprises providing, by the sub key generator application 46, the trusted security zone sub key to the second trusted service manager server 41 so that the second trusted service manager server 41 may access the second set of one or more trusted security zone containers 27.

Figure 5:
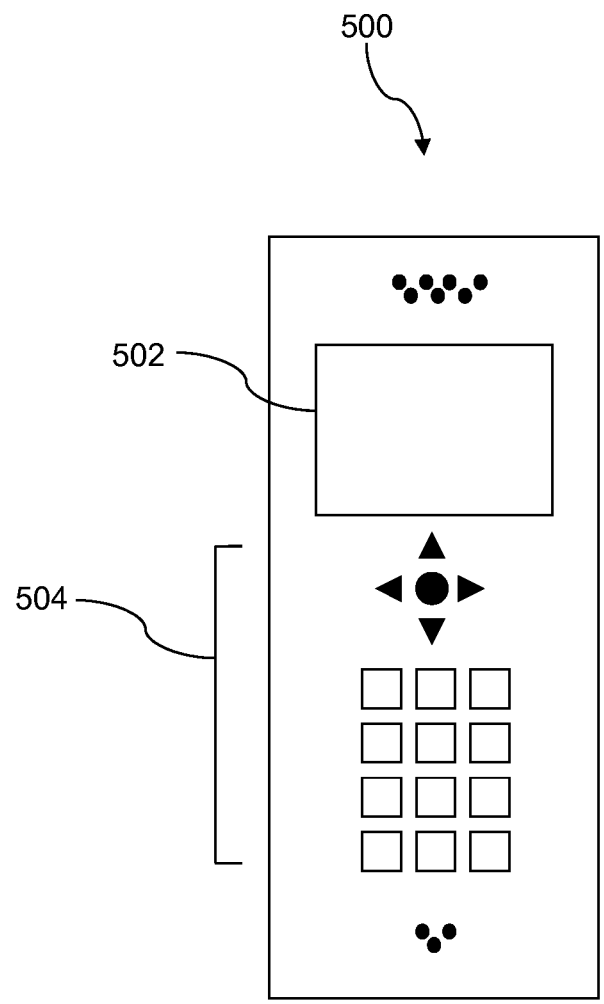
FIG. 5 is an illustration of a mobile communication device according to an embodiment of the disclosure.

FIG. 5 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 502 and a touch-sensitive surface and/or keys 504 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 502 to show a web page. The web page may be obtained via wireless communications with a base transceiver station, a wireless network access node, a peer mobile device 500 or any other wireless communication network or system.

Figure 6:
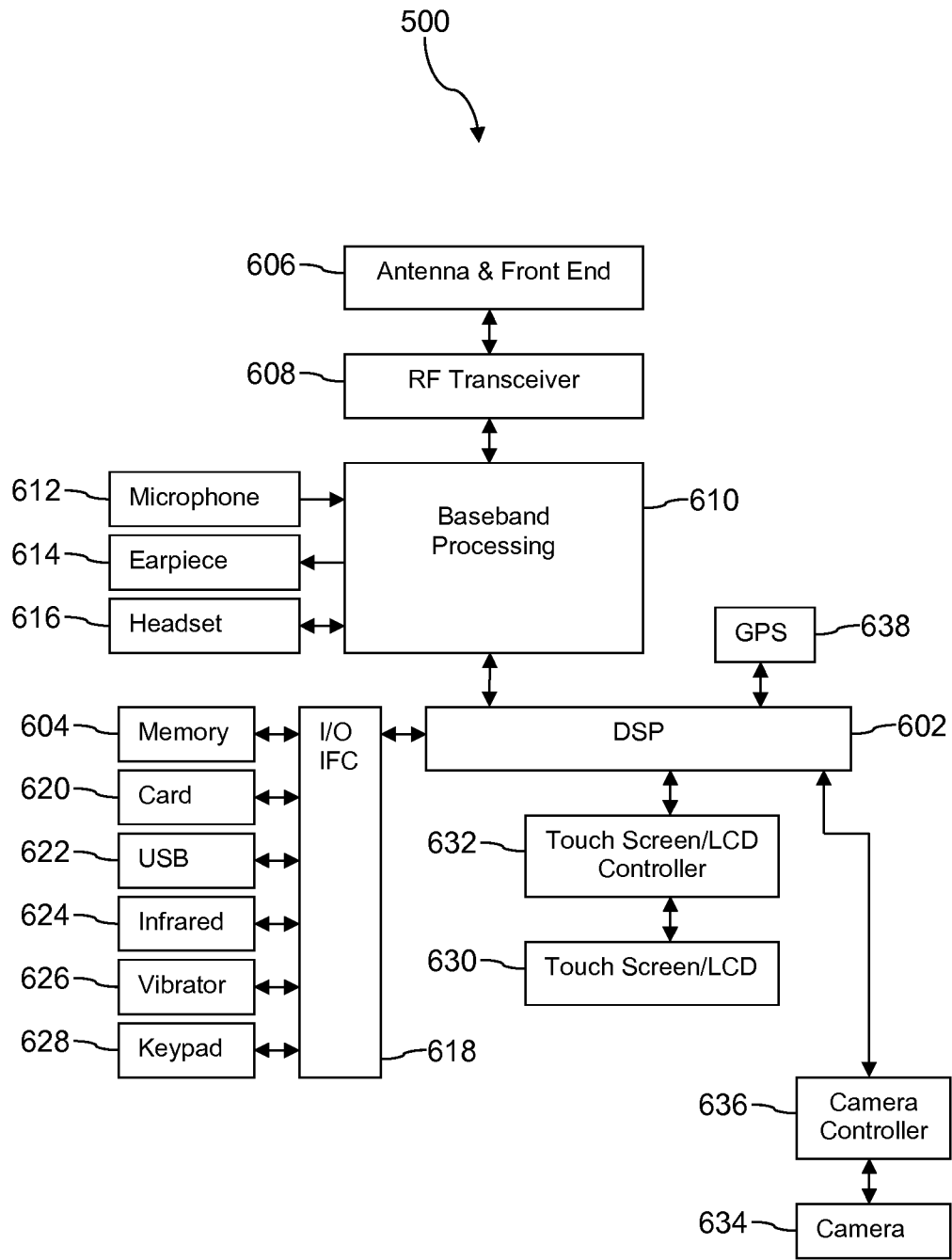
FIG. 6 is a block diagram of a mobile communication device according to an embodiment of the disclosure.

FIG. 6 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 602 and a memory 604. As shown, the mobile device 500 may further include an antenna and front end unit 606, a radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a camera 634, a camera controller 636, and a global positioning system (GPS) receiver 638. In an embodiment, the mobile device 500 may include another kind of display that does not provide a touch sensitive screen. In an embodiment, the DSP 602 may communicate directly with the memory 604 without passing through the input/output interface 618. Additionally, in an embodiment, the mobile device 500 may comprise other peripheral devices that provide other functionality.

The DSP 602 or some other form of controller or central processing unit operates to control the various components of the mobile device 500 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 500 to function as a peripheral device to exchange information with a personal computer or other computer system. The infrared port 624 and other optional ports such as a Bluetooth® interface or an IEEE 802.11 compliant wireless interface may enable the mobile device 500 to communicate wirelessly with other nearby handsets and/or wireless base stations.

The keypad 628 couples to the DSP 602 via the interface 618 to provide one mechanism for the user to make selections, enter information, and otherwise provide input to the mobile device 500. Another input mechanism may be the touch screen LCD 630, which may also display text and/or graphics to the user. The touch screen LCD controller 632 couples the DSP 602 to the touch screen LCD 630. The GPS receiver 638 is coupled to the DSP 602 to decode global positioning system signals, thereby enabling the mobile device 500 to determine its position.

Figure 7A:
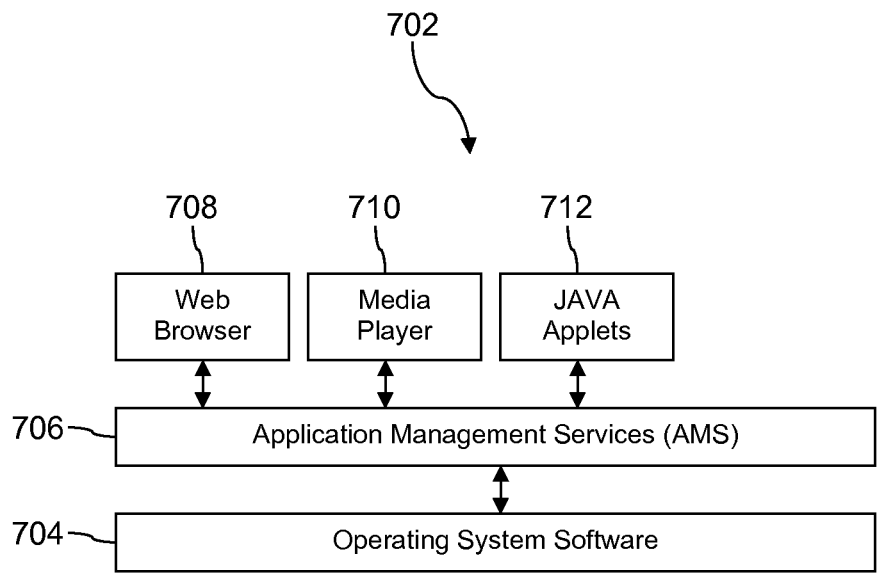
FIG. 7A is a block diagram of a software architecture of a mobile communication device according to an embodiment of the disclosure.

FIG. 7A illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the mobile device 500. Also shown in FIG. 7A are a web browser application 708, a media player application 710, and JAVA applets 712. The web browser application 708 may be executed by the mobile device 500 to browse content and/or the Internet, for example when the mobile device 500 is coupled to a network via a wireless link. The web browser application 708 may permit a user to enter information into forms and select links to retrieve and view web pages. The media player application 710 may be executed by the mobile device 500 to play audio or audiovisual media. The JAVA applets 712 may be executed by the mobile device 500 to provide a variety of functionality including games, utilities, and other functionality.

Figure 7B:
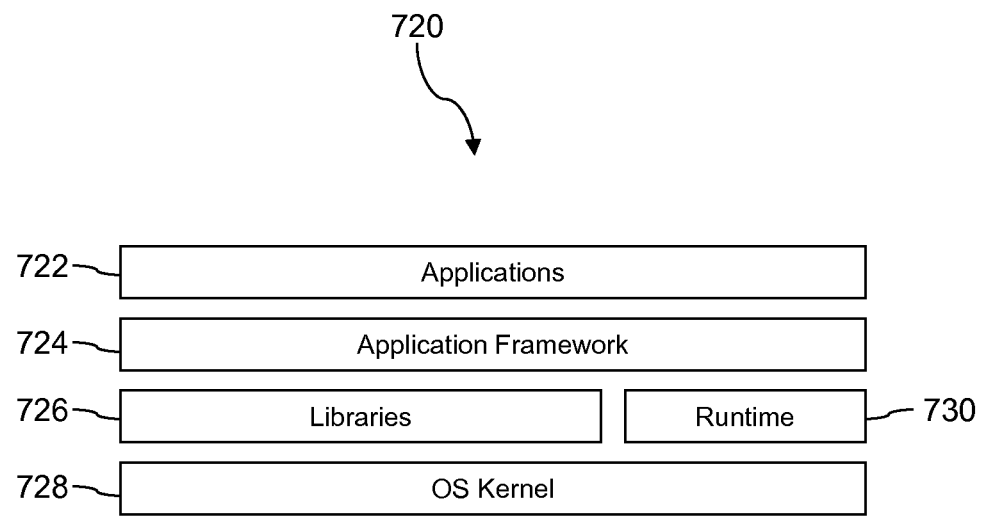
FIG. 7B is a block diagram of another software architecture of a mobile communication device according to an embodiment of the disclosure.

FIG. 7B illustrates an alternative software environment 720 that may be implemented by the DSP 602. The DSP 602 executes operating system software 728 (for example an operating system kernel) and an execution runtime 730. The DSP 602 executes applications 722 that may execute in the execution runtime 730 and may rely upon services provided by the application framework 724. Applications 722 and the application framework 724 may rely upon functionality provided via the libraries 726.

Figure 8:
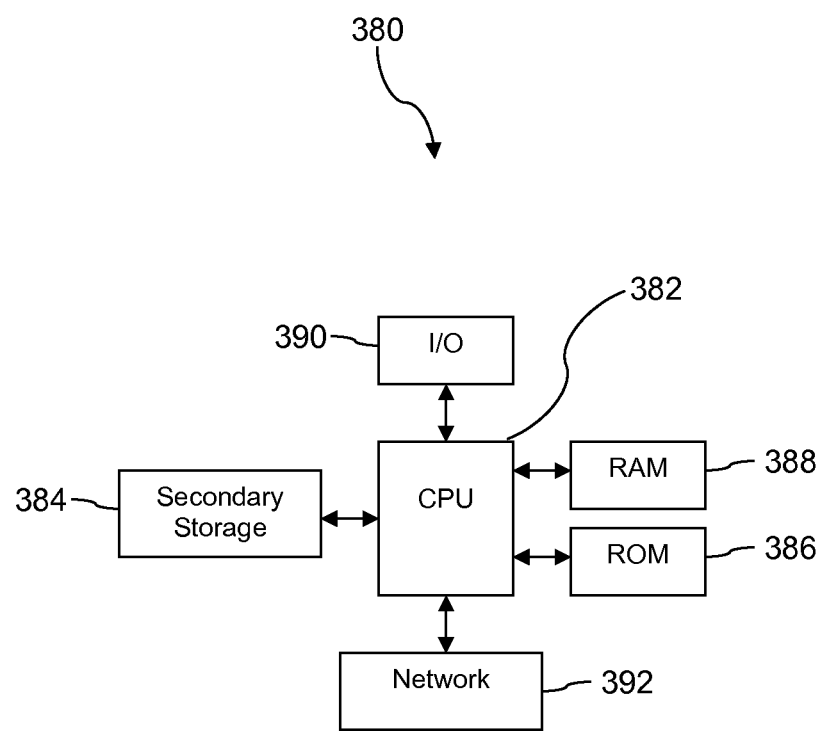
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), $4^{th}$ generation, $5^{th}$ generation, and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing access to a trusted security zone of a mobile device, comprising:
    receiving, by an application, trusted service manager validation data from a trusted service manager, wherein the trusted service manager validation data is uniquely associated with the trusted service manager;
    receiving, by the application, a trusted security zone master key;
    hashing, by the application, the trusted service manager validation data with the trusted security zone master key to generate a trusted security zone sub key configured to provide access to a set of one or more trusted security zone containers of the plurality of trusted security zone containers, wherein the hashing is completed using a one-way secure hash function;
    generating, by the application, the trusted security zone sub key based on hashing to access the set of one or more trusted security zone containers of the trusted security zone;
    transmitting at least one message to provision at least in part the set of one or more trusted security zone containers with the trusted security zone sub key; and
    providing, by the application, the trusted security zone sub key to the trusted service manager so that the trusted service manager may access the set of one or more trusted security zone containers, wherein the trusted security zone comprises a hardware assisted trust zone.

2. The method of claim 1, wherein the application is configured to hide the content of the trusted security zone sub key from a first trusted service manager and hide the content of the trusted security zone master key from a second trusted service manager, wherein the first trusted service manager provides the trusted security zone master key to the application and the second trusted service manager is associated with the trusted service manager validation data.

3. The method of claim 1, wherein the trusted service manager validation data is generated by a master trusted service manager and provided to the trusted service manager upon validation of the trusted service manager by the master trusted service manager.

4. The method of claim 1, wherein the trusted service manager validation data expires after a predetermined amount of time and the application rejects the trusted service manager validation data after the predetermined amount of time.

5. The method of claim 1, wherein the trusted service manager validation data expires after a predetermined number of attempts and the application rejects the trusted service manager validation data after the predetermined number of attempts.

6. The method of claim 1, wherein the trusted security zone is located on a mobile device.

7. The method of claim 1, wherein the application is stored on a network server in communication with a mobile device.

8. The method of claim 1, wherein the trusted security zone sub key is configured to provide access to a specific set of one or more trusted security zone containers of the plurality of trusted security zone containers based on the trusted service manager validation data.

9. A method for providing access to a trusted security zone of a mobile device, comprising:
  receiving, by an application, trusted service manager validation data from a trusted service manager, wherein the trusted service manager validation data is generated by a master trusted service manager and associated with the trusted service manager;
  receiving, by the application, a trusted security zone master key, wherein the trusted security zone master key provides access to a plurality of trusted security zone containers within the trusted security zone, wherein the trusted security zone comprises a hardware assisted trust zone; and
  generating, by the application, a trusted security zone sub key by hashing the trusted service manager validation data with the trusted security zone master key, wherein the trusted service manager validation data is used by the application to generate the trusted security zone sub key dedicated to a set of one or more trusted security zone containers of the plurality of trusted security zone containers, and wherein the hashing is completed using a one-way secure hash function.

10. The method of claim 9, wherein the application is configured to hide the content of the trusted security zone sub key from a first trusted service manager and hide the content of the trusted security zone master key from a second trusted service manager, wherein the first trusted service manager provides the trusted security zone master key to the application and the second trusted service manager is associated with the trusted service manager validation data.

11. The method of claim 9, wherein the trusted service manager validation data expires after a predetermined amount of time and the application rejects the trusted service manager validation data after the predetermined amount of time.

12. The method of claim 9, wherein the trusted service manager validation data expires after a predetermined number of attempts and the application rejects the trusted service manager validation data after the predetermined number of attempts.

13. The method of claim 9, wherein the application is stored on a network server in communication with a mobile device comprising the trusted security zone.

14. The method of claim 9, wherein the trusted security zone sub key is configured to provide access to a specific set of one or more trusted security zone containers of the plurality of trusted security zone containers based on the trusted service manager validation data.

15. A method for protecting data of two or more different trusted service managers stored in a trusted security zone of a mobile device comprising:
  validating a first trusted service manager, wherein validating the first trusted service manager comprises obtaining one or more service manager server credentials;
  providing a trusted security zone key to the first trusted service manager in response to validating the first trusted service manager, wherein the first trusted service manager uses the trusted security zone key to access a first set of one or more trusted security zone containers;
  receiving, by an application, a second trusted service manager validation data associated with a second trusted service manager;
  receiving, by the application, the trusted security zone master key, wherein the trusted security zone master key provides access to a plurality of trusted security zone containers within the trusted security zone;
  hashing, by the application, the second trusted service manager validation data with the trusted security zone master key to generate a trusted security zone sub key configured to provide access to a second and different set of one or more trusted security zone containers of the plurality of trusted security zone containers, wherein the hashing is completed using a one-way secure hash function;
  generating, by the application, the trusted security zone sub key based on hashing to provide to the second trusted service manager access to the second set of one or more trusted security zone containers;
  transmitting one or more signals to provision the second set of one or more trusted security zone containers with only the trusted security zone sub key so that first trusted service manager may not access the second set of one or more trusted security zone containers with the trusted security zone master key; and
  providing, by the application, the trusted security zone sub key to the second trusted service manager so that the second trusted service manager may access the second set of one or more trusted security zone containers, wherein the trusted security zone comprises a hardware assisted trust zone.

16. The method of claim 15, wherein the application receives the trusted security zone master key from the first trusted service manager in response to the second trusted service manager presenting the second trusted service manager validation data to the application.

17. The method of claim 15, wherein the trusted security zone master key is the only trusted security zone master key associated with the trusted security zone of a specific mobile device.

18. The method of claim 15, wherein the second set of one or more trusted security zone containers are provisioned with the trusted security zone sub key to expire after a predetermined amount of time and the second trusted service manager server loses access to the second set of one or more trusted security zone containers after the predetermined period of time.

19. The method of claim 15, wherein the second set of one or more trusted security zone containers are provisioned with the trusted security zone sub key to expire after a predetermined number of attempts and the second trusted service manager server loses access to the second set of one or more trusted security zone containers after the predetermined number of attempts.

20. The method of claim 15, further comprising:
receiving, by the application, a third trusted service manager validation data associated with a third trusted service manager;
receiving, by the application, the trusted security zone master key;
hashing, by the application, the third trusted service manager validation data with the trusted security zone master key to generate a second trusted security zone sub key configured to provide access to a third and different set of one or more trusted security zone containers of the plurality of trusted security zone containers, wherein the hashing is completed using a one-way secure hash function;
generating, by the application, the second trusted security zone sub key based on hashing to provide to the third trusted service manager access to the third set of one or more trusted security zone containers;
transmitting one or more signals to provision the third set of one or more trusted security zone containers with only the second trusted security zone sub key so that first trusted service manager and the second trusted service manager may not access the third set of one or more trusted security zone containers with the trusted security zone sub key or the trusted security zone master key; and
providing, by the application, the second trusted security zone sub key to the third trusted service manager so that the third trusted service manager may access the third set of one or more trusted security zone containers.

* * * * *